(12) United States Patent
Gal

(10) Patent No.: US 7,292,626 B1
(45) Date of Patent: Nov. 6, 2007

(54) METHOD AND SYSTEM FOR EFFICIENT QUANTIZATION IN DAC AND ADC FOR DISCRETE MULTITONE SYSTEMS

(75) Inventor: Avi Gal, Herzlia (IL)

(73) Assignee: National Semiconductor Corporation, Santa Clara, CA (US)

( * ) Notice: Subject to any disclaimer, the term of this patent is extended or adjusted under 35 U.S.C. 154(b) by 836 days.

(21) Appl. No.: 10/162,416

(22) Filed: Jun. 4, 2002

Related U.S. Application Data

(60) Provisional application No. 60/295,724, filed on Jun. 4, 2001.

(51) Int. Cl.
*H04B 1/38* (2006.01)

(52) U.S. Cl. .................. 375/222; 375/260; 709/247

(58) Field of Classification Search .......... 375/222, 375/240, 295, 316, 219, 260; 370/356, 441, 370/436, 442; 709/247, 227, 236; 379/3, 379/406.08; 455/402
See application file for complete search history.

(56) References Cited

U.S. PATENT DOCUMENTS

| | | | | |
|---|---|---|---|---|
| 4,841,299 A | * | 6/1989 | Weaver | 341/65 |
| 5,319,634 A | * | 6/1994 | Bartholomew et al. | 370/441 |
| 5,550,893 A | * | 8/1996 | Heidari | 455/553.1 |
| 5,790,632 A | * | 8/1998 | Antonio et al. | 379/3 |
| 6,044,107 A | * | 3/2000 | Gatherer et al. | 375/222 |
| 6,292,840 B1 | * | 9/2001 | Blomfield-Brown et al. | 709/247 |
| 6,404,763 B1 | * | 6/2002 | Renucci et al. | 370/352 |
| 6,560,225 B1 | * | 5/2003 | Czajkowski et al. | 370/356 |
| 2002/0024998 A1 | * | 2/2002 | Cooper | 375/240.01 |
| 2003/0067990 A1 | * | 4/2003 | Bryant | 375/259 |

OTHER PUBLICATIONS

The all digital loop: benefits of an integrated voice-data access network Ploumen, F.M.; De Clerq, L.; Communication Technology Proceedings, 2000. WCC—ICCT 2000. International Conference on vol. 1, Aug. 21-25, 2000 pp. 16-21 vol. 1.*
Voice delay considerations for DSL multimedia access network design and operation Wright, S.; Vernon, A.J.; Whited, A.;Multimedia Services Access Networks, 2005. MSAN '05. 2005 1st International Conference onJun. 13-15, 2005 pp. 111-115.*
Voice over DSL Grant, M.; Multimedia in the Local Loop—the DSL Seminar (Ref. No. 2000/022), IEE Jan. 26, 2000 pp. 3/1-3/15.*

* cited by examiner

*Primary Examiner*—Temesghen Ghebretinsae

(57) ABSTRACT

An ADSL modem includes a modulator unit with an output analog expander and/or a demodulator unit with an input analog compressor. The modulator unit further includes (a) a first DSP engine outputting a plurality of k-bit words to a non-linear discrete compressor, which compresses the words into plurality of m-bit words wherein m<k; and (b) a digital-to-analog unit that converts the m-bit words into an analog signal for input to the analog expander.

17 Claims, 1 Drawing Sheet

METHOD AND SYSTEM FOR EFFICIENT QUANTIZATION IN DAC AND ADC FOR DISCRETE MULTITONE SYSTEMS

CLAIM FOR PRIORITY

This application claims priority to U.S. Provisional Patent Application Ser. No. 60/295,724 filed Jun. 4, 2001.

TECHNICAL FIELD OF THE INVENTION

The present invention is directed, in general, to communications systems and, more specifically, to improved quantization of the signal-to-noise ratio in discrete multi-tone communications systems.

BACKGROUND OF THE INVENTION

Various communication systems use discrete multi-tone (DMT) signaling, in which the available bandwidth is split into a large number of sub-channels. DMT techniques are based on using many narrow-band carriers, all of which are operating simultaneously. Each narrow-band carrier conveys a small fraction of the total information. The main use of the DMT technique is in the Asymmetrical Digital Subscriber Line (ADSL) modem.

DMT signals suffer from high Peak-to-Average Ratio (PAR), which occurs as a result of the large number of sub-channels required in order to achieve near optimum performance, and large amplitude peak values that occur in the case when all or a substantial number of the sub-channels add constructively. Such high PAR leads to severe constraints on the dynamic range of the line drivers, as well as on the number of bits employed within the Analog-to-Digital Converter (ADC) and the Digital-to-Analog Converter (DAC). Therefore, high resolution linear CODECs (COder/DECoder) are required in order to achieve the desired quantization Signal-to-Noise Ratio (SNR). High resolutions are achieved by a large number of bits.

The article "On the Uniform ADC Bit Precision and Clip Level Computation for a Gaussian Signal" by Noafal Al-Dahir and John M. Cioffi, *IEEE Transactions on Signal Processing*, Vol. 44, No. 2, February 1996, discloses two analysis methods for computing the required bit precision of the uniform quantizer for multi-carrier input signals of an ADC. The first method fixes the probability of overload and sets the dynamic range of the quantizer to accommodate the worst-case Signal-to-Quantization Noise Ratio (SQNR). In other words, this method ensures that quantization effects do not degrade the SNR by more than a desired value in decibels (dBs). The desired value is reached by restriction of the number of information bits per dimension for each sub-channel and determination of the probability of error.

The second method sets the clipping level (where "clipping" means limiting the signal's maximum amplitude) of the quantizer to meet a desired overload distortion level, using knowledge of the input Probability Density Function (PDF).

The two identified methods use uniform ADC and a bit precision and a clip level computation for Gaussian signals. In both methods, however, high peak-to-average ratios require a large dynamic range from ADC and DAC. Therefore, a large number of bits are required for obtaining the desired quantization SNR.

The article "Analysis of Clipping Effect in DMT Based ADSL Systems" by D. Mestdagh, P. Spruyt and B. Biran, *Proc. Int. Conf. Commun.*, May 1994, discloses the effect of clipping a DMT signal. That publication demonstrates that clipping can reduce the number of bits in the ADC and the DAC, as well as the dynamic range of the line drivers, while keeping the overall SNR the same as without clipping. However, the SQNR remains at a lower value.

All the methods described above, although providing satisfactory gain and, in some instances, a higher SQNR with low bit precision, are not entirely satisfactory. There is, therefore, a need in the art for improving quantization SNR for DMT systems, and particularly for achieving such improvement while retaining the length of the CODEC words and the digital-to-analog (D/A) and analog-to-digital (A/D) bits necessary for a required SQNR.

SUMMARY OF THE INVENTION

To address the above-discussed deficiencies of the prior art, it is a primary object of the present invention to provide, for use in an ADSL modem, a modulator unit with an output analog expander and/or a demodulator unit with an input analog compressor. The modulator unit further includes (a) a first DSP engine outputting a plurality of k-bit words to a non-linear discrete compressor, which compresses the words into plurality of m-bit words wherein k<k; and (b) a digital-to-analog unit that converts the m-bit words into an analog signal for input to the analog expander.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form. Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
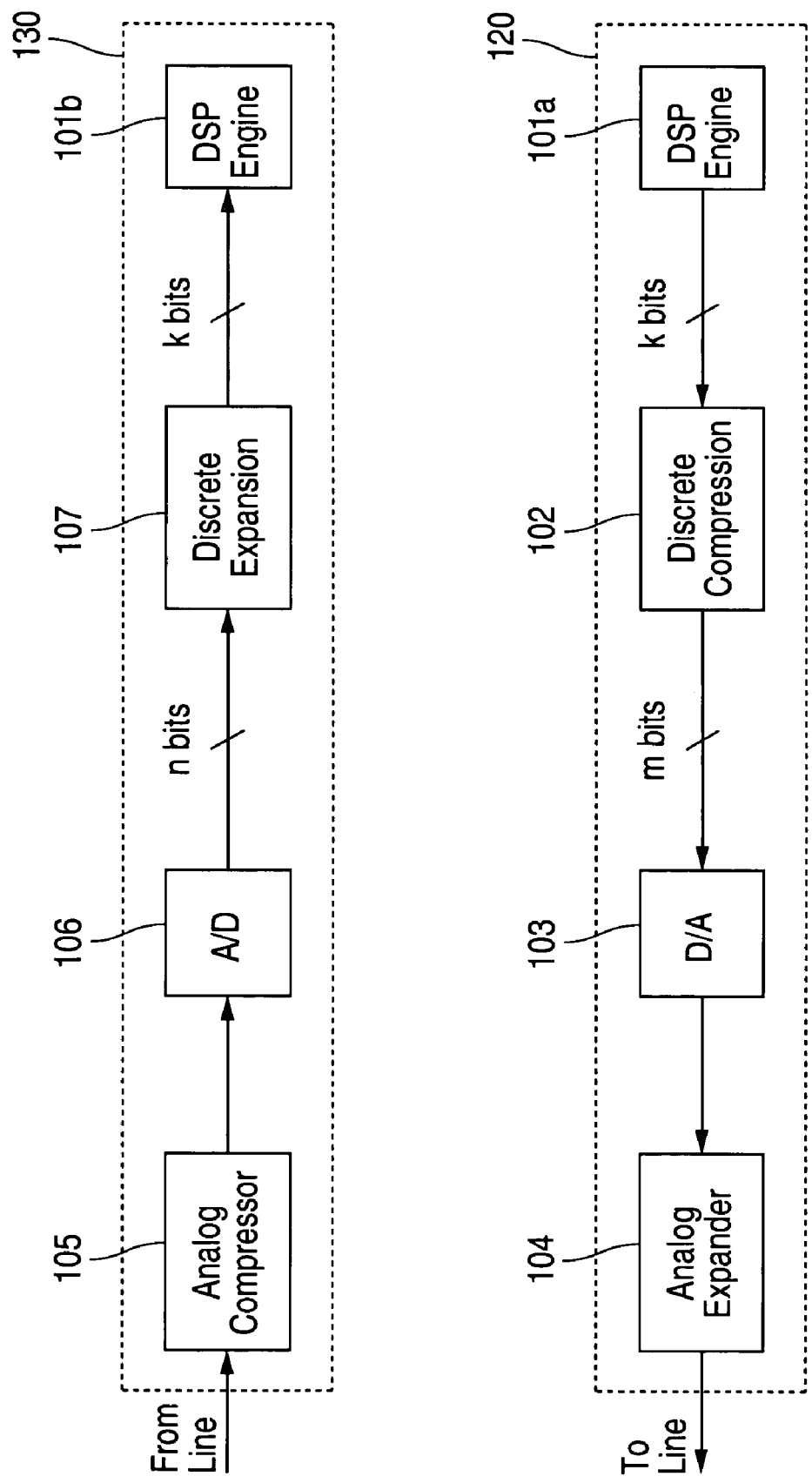
FIG. 1 depicts, in block diagram form, a transmitter and receiver for the DMT signaling according to one embodiment of the invention.

FIG. 1, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

FIG. 1 depicts, in block diagram form, a transmitter and receiver for the DMT signaling according to one embodiment of the invention. The transmitter 120 includes a k bit digital signal processing (DSP) engine 101a (where k is any positive integer), which is used for modem data calculations. The DSP engine 101a outputs k bit words, which are then compressed by a discrete compression unit 102 into m bits words (wherein m is any positive integer such that k is larger than m) by at least 1 bit. DAC 103 converts the compressed digital data into an analog signal. After the conversion, the analog signal is convoyed into analog expander 104, which expands the analog signal in order to transmit it over a transmission channel.

Receiver 130 receives the transmitted analog signal from the transmission channel into analog compressor 105, which compresses the analog data and convoys it to the ADC 106. ADC 106 converts the compressed analog data into n bits of digital data (where n is any positive integer smaller than k). The n bit digital data goes into discrete expansion unit 107, which expands the n bit digital words into k bit words, wherein k is larger than n. The expanded k bit word is then passed the DSP engine 101b for appropriate modem calculation.

Transmitter 120 and receiver 130 may be either contained within a single ADSL modem or within two separate units of ADSL modems.

The present invention takes advantage of the non-uniform Probability Density Function (PDF) of the transmitted and received DMT signal, and the higher resolution of the DSP engine (length of k bit word) over the resolution of the DAC and ADC (length of m bit data and n bit words, respectively, wherein n and m are smaller then k).

The following calculations show the theoretical quantization SNR gain obtained by the present invention. In the simulation of a transmission path for a Gaussian PDF, the desired maximum value of the DAC m bit word (Xmax) as compared to the square root of the signal variance ($\sigma$) is calculated as follows:

$$\text{clip\_prob} = 2 \cdot Q\left(\frac{X_{\max}}{\sigma}\right) \quad (1)$$

$$\beta = \frac{X_{\max}}{\sigma} = Q^{-1} \cdot \left(\frac{\text{clip\_prob}}{2}\right) \quad (2)$$

where Q is the upper tail of the normal distribution and clip_prob represents the clipping probability. For the clipping probability clip_prob=$10^{-7}$ required by the T1.413 standard for ADSL, $\beta$=5.3267. In a signed binary format, $X_{max}=2^{(m-1)}$.

In a high-resolution quantization, the signal-to-noise ratio of uniform linear DAC with m bit words is:

$$SNR_{uniform} \approx \frac{3 \cdot 2^{m2}}{\beta^2} \approx 6 \cdot m + 4.8 - 20 \cdot \log_{10}(\beta) \quad (3)$$

Optimum nonlinear compression function characteristics, for a signal with a known PDF $P_x(X)$ and high resolution quantization, can be approximated by the equation:

$$c(x) = \frac{X_{\max} \cdot \int_0^x \sqrt[3]{P_x(x)d\,x}}{\Psi}, \text{ where } \Psi = \int_0^{X_{\max}} \sqrt[3]{P_x(x)d\,x}. \quad (4)$$

A non-linear quantization system of the type employed in the present invention uses an optimum continuous compression function, with linear m bit quantization, and a continuous extraction function. The approximated quantization noise energy of this system is:

$$\sigma_q = \frac{2}{3 \cdot 2^{m2}} \cdot \Psi^3 \quad (5)$$

Therefore, optimum signal to quantization noise ratio is:

$$SNR_{opt} \approx \frac{X_{\max}^2 \cdot 3 \cdot 2^{m2}}{\beta^2 \cdot \Psi^3} \approx 6 \cdot m + 4.8 - 20 \cdot \log_{10}(\beta) + 10 \cdot \log_{10}\left(\frac{X_{\max}^2}{\Psi^3}\right). \quad (6)$$

The gain obtained by using optimum compression according to the present invention is:

$$G_{opt} = SNR_{opt} - SNR_{uniform} \approx 10 \cdot \log_{10}\left(\frac{X_{\max}^2}{\Psi^3}\right) = 10 \cdot \log_{10}\left(\frac{2^{m2}}{\Psi^3}\right) \quad (7)$$

In the use of 12 bit quantization, $G_{opt}$=5.4 dB.

The transmitter 120 of FIG. 1 has a high resolution DSP engine 101a, having a kit bit word, which transfer the samples to a lower resolution DAC 103 with $2^m$ levels. The compressing function in this case is a discrete function, mapping $2^k$ values to $2^m$ values. Since the compression function is not continuous, the performance of the non-linear compression gain is expected to be less than the $G_{opt}$ of equation (7). Nevertheless, each excess bit that the DSP has over the DAC provides a quantization improvement of approximately 6 dB. Therefore, when k is larger than m by 3 bits or more, the discrete compression function that maps $2^k$ values to $2^m$ values can be treated as continuous in regard to the D/A resolution. In fact, simulation of the present invention with k=16 and m=12 shows a gain of 5.3 dB, which is 0.1 dB less than $G_{opt}$.

The compressed signal from the DAC 103 is decompressed using an analog expander 104. An optimal function analog expander may be difficult to realize. Therefore, a sub-optimal A-law expander is employed. A-law is a standard for converting analog data into digital data. Simulated results using an A-law compressor and expander, with the values A=6.5, k=16 and m=12, show a gain of 4.2 dB, which is 1.2 dB less than $G_{opt}$.

The transmission channel (received path) was simulated by the transmission of data over different standard lines and different compression functions. The results of the simulation with A-law compression, with A=12, n=12 and k=16 over T1.601 #7 line, shows a gain of 5.3 dB with optimum compression function. Compression with A-law function, wherein A=6.5, provides a gain of 4.2 dB. A simulation with CSA #4 line shows a similar results.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A discrete multi-tone modulator comprising:
    a digital signal processor producing a digital signal comprising k-bit words;
    a discrete compression unit receiving the digital signal and compressing the k-bit words into m-bit words, wherein m is less than k; and
    a digital-to-analog converter receiving the m-bit words from the discrete compression unit and converting the m-bit words into m analog signals for concurrent transmission over a transmission channel having m sub-channels;
    wherein k and m are integers and the discrete compression unit maps the k-bit words to the m-bit words based on a discrete compression function that is effectively continuous with respect to a resolution of the digital-to-analog converter.

2. The discrete multi-tone modulator according to claim 1, wherein m is less than or equal to k−3.

3. The discrete multi-tone modulator according to claim 1, wherein the discrete compression unit is an A-law compressor.

4. A discrete multi-tone demodulator comprising:
    an analog-to-digital converter receiving n analog signals concurrently transmitted over a transmission channel having n sub-channels and converting the n analog signals into a digital signal comprising n-bit words;
    a discrete expansion unit receiving the digital signal and expanding the n-bit words into k-bit words, wherein k is greater than n; and
    a digital signal processor receiving and operating on the k-bit words;
    wherein k and n are integers and the discrete expansion unit maps the n-bit words to the k-bit words based on a discrete expansion function that is effectively continuous with respect to a resolution of the analog-to-digital converter.

5. The discrete multi-tone demodulator according to claim 4, wherein k is greater than or equal to n+3.

6. The discrete multi-tone demodulator according to claim 4, wherein the discrete expansion unit is an A-law expander.

7. An asymmetrical digital subscriber line discrete multi-tone modem comprising:
    a modulator comprising:
        a first digital signal processor producing a first digital signal comprising first k-bit words;
        a discrete compression unit receiving the first digital signal and compressing the first k-bit words into m-bit words, wherein m is less than k; and
        a digital-to-analog converter receiving the m-bit words from the discrete compression unit and converting the m-bit words into m analog signals for concurrent transmission over a transmission channel having m sub-channels; and
    a demodulator comprising:
        an analog-to-digital converter receiving n analog signals concurrently transmitted over a transmission channel having n sub-channels and converting the n analog signals into a second digital signal comprising n-bit words;
        a discrete expansion unit receiving the second digital signal and expanding the n-bit words into second k-bit words, wherein k is greater than n; and
        a second digital signal processor receiving and operating on the second k-bit words;
        wherein k, m, and n are integers and the discrete compression unit employs a compression function that is effectively continuous with respect to a resolution of the digital-to-analog converter.

8. The modem according to claim 7, wherein each of m and n is less than or equal to k−3.

9. The modem according to claim 7, wherein the discrete compression unit maps the first k-bit words to the m-bit words based on a discrete compression function and the discrete expansion unit maps the n-bit words to the second k-bit words based on a discrete expansion function.

10. The modem according to claim 9, wherein the discrete expansion unit employs an expansion function that is effectively continuous with respect to a resolution of the analog-to-digital converter.

11. The modem according to claim 10, wherein the discrete compression unit is an A-law compressor and the discrete expansion unit is an A-law expander.

12. A method of modulating a discrete multi-tone signal comprising:
    producing a digital signal comprising k-bit words;
    compressing the k-bit words into m-bit words, wherein k and m are integers and m is less than k;
    mapping the k-bit words to the m-bit words based on a discrete compression function;
    employing a compression function that is effectively continuous with respect to a resolution of a digital-to-analog converter; and
    converting the m-bit words into m analog signals for concurrent transmission over a transmission channel having m sub-channels.

13. The method according to claim 12, wherein m is less than or equal to k−3.

14. The method according to claim 12, wherein the step of employing a compression function that is effectively continuous with respect to a resolution of the digital-to-analog converter further comprises:
    employing an A-law compressor.

15. A method of demodulating a discrete multi-tone signal comprising:
    receiving n analog signals concurrently transmitted over a transmission channel having n sub-channels;
    converting the n analog signals into a digital signal comprising n-bit words;
    expanding the n-bit words into k-bit words, wherein k and n are integers and k is greater than n;

mapping the n-bit words to the k-bit words based on a discrete expansion function;
employing an expansion function that is effectively continuous with respect to a resolution of an analog-to-digital converter; and
operating on the k-bit words.

16. The method according to claim 15, wherein k is greater than or equal to n+3.

17. The method according to claim 15, wherein the step of employing an expansion function that is effectively continuous with respect to a resolution of the analog-to-digital converter further comprises:
employing an A-law expander.

* * * * *